Patented May 26, 1925.

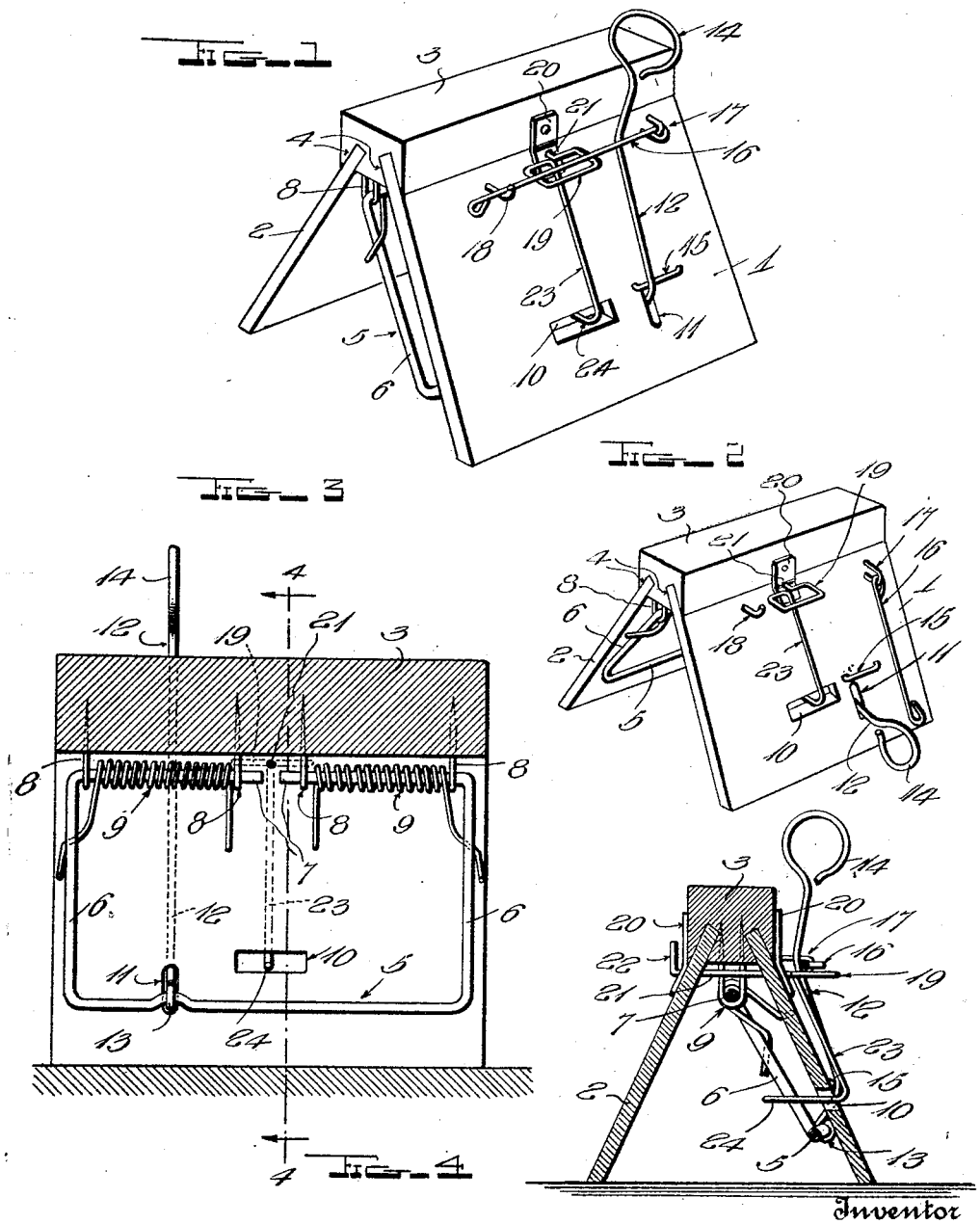

1,539,666

UNITED STATES PATENT OFFICE.

GEORGE H. HAGERMANN, OF MUSCATINE, IOWA.

TRAP.

Application filed January 21, 1924. Serial No. 687,611.

*To all whom it may concern:*

Be it known that I, GEORGE H. HAGERMANN, a citizen of the United States, residing at Muscatine, in the county of Muscatine and State of Iowa, have invented certain new and useful Improvements in Traps; and I do declare the following to be a full, clear, and exact description of the invention, such as will enable others skilled in the art to which it appertains to make and use the same.

My invention relates to improvements in traps and relates more particularly to one which is designated primarily for catching mice, rats, ground squirrels and the like.

One object of the invention is to provide a trap which includes a horizontal runway open at both of its ends, so that the prey may see entirely through the trap and hence will not be as suspicious thereof as otherwise. In this connection, a further aim is to have the runway open also at its bottom and free of treadles or the like, so that as the prey enters the trap, no difference will be noticed in the footing upon which he walks.

Yet another aim is to provide a trap with a runway as above set forth, including means adjacent each end of said runway operative to catch the prey regardless of the direction from which he enters the trap.

A still further aim is to provide novel means for setting the trap and holding it in set position, provision being made whereby the operator does not have to touch the spring-actuated jaw by means of which the prey is killed, thus providing a trap which is much more sanitary than those commonly used.

With the foregoing in view, the invention resides in the novel subject matter hereinafter described and claimed, the description being supplemented by the accompanying drawing.

Figures 1 and 2 are perspective views of a trap constructed in accordance with my invention showing it respectively in set and sprung positions.

Figure 3 is a central vertical longitudinal sectional view showing the trap set.

Figure 4 is a vertical transverse sectional view on line 4—4 of Fig. 3.

In the form of construction selected for illustration in the present application, the numerals 1 and 2 designate a pair of upwardly converging side walls which are entirely free of connection at their lower ends but are connected at their upper ends by an elongated ridge block 3 which may well have grooves 4 in which the walls are secured, if wooden construction is used. If a metal construction is employed, however, this detail is not necessary and the entire runway formed in the present showing by the parts 1, 2 and 3 may be formed from one or more pieces of sheet metal.

I have shown a substantially U-shaped jaw 5 between the walls 1 and 2, the vertical arms 6 of said jaw being disposed adjacent the opposite ends of the runway so that one or the other of them may operate to kill the prey regardless of the direction in which he enters the trap. I have shown the upper ends of the arms 6 bent inwardly toward each other as indicated at 7 and connected by staples 8 with the ridge block 3, so that the entire jaw 5 is pivotally hung from said block. Appropriate springs 9 have been shown surrounding the portions 7 of the arms 6, for the purpose of throwing the jaw 5 toward the wall 2, when the trap is sprung.

Near its lower end, I have shown the wall 1 provided with a horizontal slot 10 and with a vertical slot 11. Through the slot 11, a link 12 passes, the inner end of said link being pivotally connected at 13 with the jaw 5, while its outer end is preferably provided with a finger ring or the like 14. By pulling this ring outwardly and moving it at the same time to swing the link 12 upwardly toward the wall 1, the jaw 5 may be easily retracted against the action of the springs 9 anl set, as shown in Figs. 1, 3 and 4. I preferably provide a short length of wire or the like 15, secured to the outer side of the wall 1 at the upper end of the slot 11, to form a shoe over which the link 12 slides when the trap is being set or sprung. An arm 16 is loosely pivoted at 17 to the upper end portion of the wall 1 and is adapted to be swung across the link 12 when the latter is in set position, as shown most clearly in Fig. 1, the free end of said arm 16 being adapted for engagement with a stationary hook 18 carried by said wall. Thus, it will be seen that the link 12 is held in its raised position and consequently the jaw 5 is retained in a set position.

For releasing the arm 16, I preferably provide the novel construction shown. A piece of wire is bent to form an elongated frame 19 adapted to underlie the arm 16 as shown in Figs. 1 and 4, one end of the wire being passed through openings in the walls 1 and 2 and through appropriate bearing plates 20, to provide a supporting rock shaft 21 for said frame 19, the free end of this rock shaft being by preference bent laterally at 22 to prevent possible withdrawal from its bearing openings. The other end of the wire is bent downwardly from the intermediate portion of the frame 19, adjacent the shaft 21, and constitutes a trigger arm 23 disposed at the outer side of the wall 1, the lower end of this trigger arm being bent horizontally inward as indicated at 24 to provide a bait-carrying finger which passes loosely through the slot 10, to the interior of the trap.

In some instances, it is not necessary to place bait upon the finger 24, as the trap may be so positioned that any animal passing therethrough will necessarily strike this finger and cause rocking of the frame 19 to release the arm 16, thus in turn releasing the link 12 and allowing the trap to act. In most instances, however, bait is used. If desired, when trapping rather suspicious prey, a piece of cloth or the like may be used to totally obscure the jaw 5 from view, and when the trap is sprung, this cloth will move with the jaw. Even when no such obscuring means is employed, however, the jaw 5 is more or less obscured from view, as it lies very close to the inner side of the wall 1 and hence does not materially interfere with the animal's vision, entirely through the trap.

The device is simple and inexpensive, may be easily manufactured, may be set with ease, without the necessity of touching the parts which kill the prey; the prey may also be removed from the trap without touching, and the device is not only generally efficient, but is in every way desirable.

As excellent results have been obtained from the details disclosed, they are by preference followed, but within the scope of the invention as claimed, numerous minor changes may be made.

I claim:

1. A trap comprising a pair of spaced walls one of which is formed with an opening from its inner to its outer side, a spring-actuated jaw co-operable with the other wall and mounted between said walls, a jaw-setting link extending from said jaw through said opening, and trigger-released means for holding said link to retain the jaw in set position.

2. A trap comprising a pair of spaced walls one of which is formed with an opening from its inner to its outer side, a spring-actuated jaw mounted between said walls, a jaw-setting link extending from said jaw through said opening and adapted to be pulled outwardly and swung toward said one wall to set said jaw, and trigger-released means for holding said link to retain the jaw in set position.

3. A structure as specified in claim 2; together with a shoe carried by said one wall adjacent said opening across which said link slides when setting and releasing the trap.

4. A trap comprising a pair of spaced walls one of which is formed with an opening from its inner to its outer side, a spring-actuated jaw mounted between said walls, a jaw-setting link extending from said jaw through said opening and adapted to be pulled outwardly and swung upwardly toward said one wall to set said jaw, an arm pivoted to the outer side of said one wall and adapted to be swung across said link to hold the latter and retain the jaw in set position, a stationary hook for holding said arm in operative position, and a trigger arm mounted pivotally at the outer side of said one wall, said trigger arm having a portion to strike and release said first named arm and having an operating portion extending into the space between the two walls.

5. A trap comprising a pair of spaced walls one of which is formed with an opening from its inner to its outer side, a spring-actuated jaw mounted between said walls, a jaw-setting link extending from said jaw through said opening and adapted to be pulled outwardly and swung upwardly toward said one wall to set said jaw, an arm pivoted to the outer side of said one wall and adapted to be swung across said link to hold the latter and retain the jaw in set position, a stationary hook for holding said arm in operative position, and a wire bent to form a horizontal frame adjacent the operative position of said arm for releasing the latter, one end of said wire being passed through an opening in said one wall to pivotally mount said frame, the other end of said wire being extended downwardly and bent laterally inward to form a bait-carrying finger, said one wall having an opening through which said finger passes loosely.

6. A trap comprising a pair of upwardly converging walls and an elongated ridge block connecting their upper ends, a spring-actuated jaw pivotally hung from said ridge block and co-operable with one of said walls, and trigger-released means associated with the other of said walls for holding said jaw in set position.

7. A trap comprising a pair of upwardly converging walls and an elongated ridge block connecting their upper ends, one of said walls having a pair of openings, a spring actuated jaw co-operable with the other wall and pivotally hung from said ridge block between the two walls, a link extending from said jaw through one of said openings and adapted to be pulled outwardly and swung upwardly to set said jaw, an arm pivoted to the outer side of said one wall and adapted to swing across and hold said link when the latter is in raised position, a stationary hook for holding said arm, and a vertical trigger arm pivotally hung at the outer side of said one wall and adapted to strike and release said first named arm, said trigger arm having a bait-carrying finger passing through the other one of said pair of openings.

8. A trap comprising a runway opening horizontally at both ends to permit the prey to see entirely through such runway when approaching it from either direction, a spring-actuated jaw in said runway having prey-killing portions co-operable with one side wall thereof, said portions being disposed one adjacent each end of the runway, and holding means for said jaw including a trigger in the runway operable by pressure of the animal's body forwardly or backwardly in passing through the trap.

In testimony whereof I have hereunto affixed my signature.

GEORGE H. HAGERMANN.